US010160832B2

(12) United States Patent
Lobert et al.

(10) Patent No.: US 10,160,832 B2
(45) Date of Patent: Dec. 25, 2018

(54) PROCESS FOR THE PREPARATION OF EUGENOL POLYETHERS THAT CAN BE HYDROSILYLATED AND EUGENOL POLYETHERSILOXANES AND USE THEREOF

(71) Applicant: Evonik Degussa GmbH, Essen (DE)

(72) Inventors: Matthias Lobert, Essen (DE); Michael Ferenz, Essen (DE); Katrin Roland, Essen (DE); Thorsten Schierle, Essen (DE)

(73) Assignee: Evonik Degussa GmbH, Essen (DE)

( * ) Notice: Subject to any disclaimer, the term of this patent is extended or adjusted under 35 U.S.C. 154(b) by 78 days.

(21) Appl. No.: 15/508,386

(22) PCT Filed: Aug. 11, 2015

(86) PCT No.: PCT/EP2015/068438
§ 371 (c)(1),
(2) Date: Mar. 2, 2017

(87) PCT Pub. No.: WO2016/034375
PCT Pub. Date: Mar. 10, 2016

(65) Prior Publication Data
US 2017/0283554 A1 Oct. 5, 2017

(30) Foreign Application Priority Data
Sep. 5, 2014 (DE) .................. 10 2014 217 790

(51) Int. Cl.
C08G 65/40 (2006.01)
C08G 64/34 (2006.01)
C08G 64/42 (2006.01)
C08G 65/26 (2006.01)
C08G 65/336 (2006.01)
C08G 77/46 (2006.01)
B01F 17/00 (2006.01)
B01J 27/26 (2006.01)
C08G 65/34 (2006.01)
C08G 65/48 (2006.01)

(52) U.S. Cl.
CPC ...... *C08G 65/4087* (2013.01); *B01F 17/0028* (2013.01); *B01J 27/26* (2013.01); *C08G 64/34* (2013.01); *C08G 64/42* (2013.01); *C08G 65/2603* (2013.01); *C08G 65/2612* (2013.01); *C08G 65/2645* (2013.01); *C08G 65/2663* (2013.01); *C08G 65/336* (2013.01); *C08G 65/34* (2013.01); *C08G 65/48* (2013.01); *C08G 77/46* (2013.01)

(58) Field of Classification Search
None
See application file for complete search history.

(56) References Cited

U.S. PATENT DOCUMENTS

| 7,598,334 | B2 | 10/2009 | Ferenz et al. |
| 7,605,284 | B2 | 10/2009 | Brueckner et al. |
| 7,635,581 | B2 | 12/2009 | Ferenz et al. |
| 7,727,599 | B2 | 6/2010 | Doehler et al. |
| 7,776,989 | B2 | 8/2010 | Ferenz et al. |
| 7,825,207 | B2 | 11/2010 | Ferenz et al. |
| 7,834,122 | B2 | 11/2010 | Ferenz et al. |
| 7,855,265 | B2 | 12/2010 | Thum et al. |
| 7,893,128 | B2 | 2/2011 | Busch et al. |
| 7,964,694 | B2 | 6/2011 | Ferenz et al. |
| 8,030,366 | B2 | 10/2011 | Ferenz et al. |
| 8,138,294 | B2 | 3/2012 | Henning et al. |
| 8,172,936 | B2 | 5/2012 | Herrwerth et al. |
| 8,198,473 | B2 | 6/2012 | Ferenz et al. |
| 8,211,972 | B2 | 7/2012 | Meyer et al. |
| 8,420,748 | B2 | 4/2013 | Henning et al. |
| 8,455,603 | B2 | 6/2013 | Ferenz et al. |
| 8,466,248 | B2 | 6/2013 | Meyer et al. |
| 8,486,677 | B2 | 7/2013 | Thum et al. |
| 8,557,944 | B2 | 10/2013 | Henning et al. |
| 8,617,529 | B2 | 12/2013 | Herrwerth et al. |
| 8,685,376 | B2 | 4/2014 | Czech et al. |
| 8,729,207 | B2 | 5/2014 | Hartung et al. |
| 8,778,319 | B2 | 7/2014 | Herrwerth et al. |
| 8,796,000 | B2 | 8/2014 | Thum et al. |
| 8,802,744 | B2 | 8/2014 | Knott et al. |
| 8,841,400 | B2 | 9/2014 | Henning et al. |
| 8,883,932 | B2 | 11/2014 | Brugger et al. |
| 8,916,511 | B2 | 12/2014 | Maurer et al. |
| 8,946,369 | B2 | 2/2015 | Henning et al. |
| 8,957,009 | B2 | 2/2015 | Schubert et al. |

(Continued)

FOREIGN PATENT DOCUMENTS

EP 1 717 259 A1 11/2006
EP 2 011 813 A2 1/2009

OTHER PUBLICATIONS

International Search Report dated Nov. 27, 2015 in PCT/EP2015/068438 filed Aug. 11, 2015.
Jonathan R. Sargent et al., "End Group Analysis Accounts for the Low Molecular Weight Observed in the 1,3-Divinyltetramethyldisiloxane-Pt Complex Catalyzed Hydrosilylation Copolymerization of α,ω-Dienes and 1,3-Dihydridotetramethyldisiloxane", Macromolecules, vol. 32, 1999, pp. 2826-2829, XP-000824212.

(Continued)

Primary Examiner — Clinton A Brooks
Assistant Examiner — Kofi Adzamli
(74) Attorney, Agent, or Firm — Nexsen Pruet, PLLC; Philip P. McCann

(57) ABSTRACT

The present invention relates to a process for producing hydrosilylatable, eugenol-based polyethers, to the conversion thereof into polyether siloxanes and also to the products that may be produced by this process and to the use of said products as surfactants.

7 Claims, No Drawings

(56) References Cited

U.S. PATENT DOCUMENTS

| | | | |
|---|---|---|---|
| 8,993,706 | B2 | 3/2015 | Schubert et al. |
| 9,035,011 | B2 | 5/2015 | Ferenz et al. |
| 9,051,424 | B2 | 6/2015 | Lobert et al. |
| 9,175,126 | B2 | 11/2015 | Albrecht et al. |
| 9,315,614 | B2 | 4/2016 | Schubert et al. |
| 9,328,210 | B2 | 5/2016 | Terheiden et al. |
| 9,334,354 | B2 | 5/2016 | Ferenz et al. |
| 9,353,225 | B2 | 5/2016 | Knott et al. |
| 9,539,549 | B2 | 1/2017 | Haensel et al. |
| 9,540,500 | B2 | 1/2017 | Ferenz et al. |
| 9,550,928 | B2 | 1/2017 | Lobert et al. |
| 9,555,148 | B2 | 1/2017 | Wattebled et al. |
| 2006/0247141 | A1 | 11/2006 | Glos |
| 2009/0007483 | A1 | 1/2009 | Hansel et al. |
| 2009/0318635 | A1* | 12/2009 | Carrillo .......... C08L 71/12 525/474 |
| 2011/0190453 | A1 | 8/2011 | Carrillo et al. |
| 2011/0190454 | A1 | 8/2011 | Carrillo et al. |

OTHER PUBLICATIONS

U.S. Appl. No. 12/364,283, filed Feb. 2, 2009, US 2010-0036011 A1, Berend-Jan De Gans et al.
U.S. Appl. No. 13/031,324, filed Feb. 21, 2001, US 2011-0230619 A1, Dirk Kuppert et al.
U.S. Appl. No. 13/771,973, filed Feb. 20, 2013, US 2013-0217930 A1, Rene Haensel et al.
U.S. Appl. No. 14/628,991, filed Feb. 23, 2015, US 2015-0240020 A1, Thomas Veit et al.
U.S. Appl. No. 12/536,146, filed Aug. 5, 2009, US 2010-0034765 A1, Sascha Herrwerth et al.
U.S. Appl. No. 14/913,426, filed Feb. 22, 2016, US 2016-0208050 A1, Thomas Klotzbach et al.
U.S. Appl. No. 11/530,562, filed Sep. 11, 2006, US 2007-0059539 A1, Hardi Doehler et al.
U.S. Appl. No. 11/677,244, Feb. 21, 2007, US 2007-0197678 A1, Pedro Cavaleiro et al.
U.S. Appl. No. 12/024,305, Feb. 1, 2008, US 2008-0187702 A1, Michael Ferenz et al.
U.S. Appl. No. 13/992,311, filed Jun. 7, 2013, US 2013-0259821 A1, Frauke Henning et al.
U.S. Appl. No. 13/855,273, filed Apr. 2, 2013, US 2013-0267403 A1, Tadeusz Von Rymon Lipinski et al.
U.S. Appl. No. 14/906,365, filed Jan. 20, 2016, US 2016-0160081 A1, Thomas Klotzbach et al.
U.S. Appl. No. 14/813,893, filed Jul. 30, 2015, US 2015-0329752 A1, Evelyn Albrecht et al.
U.S. Appl. No. 12/750,813, filed Mar. 31, 2010, US 2010-0248325 A1, Marrit Eckstein et al.
U.S. Appl. No. 13/771,921, filed Feb. 20, 2013, US 2013-0213267 A1, Michael Fiedel et al.
U.S. Appl. No. 13/195,049, filed Aug. 1, 2011, US 2012-0028022 A1, Bastian Matthias Brugger et al.
U.S. Appl. No. 14/857,399, filed Sep. 17, 2015, US 2016-0075846 A1, Michael Krebs et al.
U.S. Appl. No. 11/327,234, filed Jan. 6, 2006, US 2006-0155090 A1, Michael Ferenz.
U.S. Appl. No. 13/124,522, filed Jun. 27, 2011, US 2011-0251070 A1, Craig Poffenberger et al.
U.S. Appl. No. 14/001,382, filed Aug. 23, 2013, US 2013-0331592 A1, Christian Hartung et al.
U.S. Appl. No. 12/370,733, filed Feb. 13, 2009, US 2010-0210445 A1, Tadeusz Von Rymon Lipinski et al.
U.S. Appl. No. 13/566,606, filed Aug. 3, 2012, US 2013-0035407 A1, Matthias Lobert et al.
U.S. Appl. No. 13/566,640, filed Aug. 3, 2012, US 2013-0035409 A1, Roland Hubel et al.
U.S. Appl. No. 13/923,896, filed Jun. 21, 2013, US 2013-0345318 A1, Frank Schubert et al.

* cited by examiner

PROCESS FOR THE PREPARATION OF EUGENOL POLYETHERS THAT CAN BE HYDROSILYLATED AND EUGENOL POLYETHERSILOXANES AND USE THEREOF

This application is a national stage application under 35 U.S.C. § 371 of International Application No. PCT/EP2015/068438 filed 11 Aug. 2015, which claims priority to DE Application No. 10 2014 217 790.1 filed 5 Sep. 2014, the disclosures of which are expressly incorporated herein by reference.

FIELD

The present invention relates to a process for producing hydrosilylatable, eugenol-based polyethers, to the conversion thereof into polyether siloxanes and also to the products that may be produced by this process and to the use of said products as surfactants.

BACKGROUND

Polyethers and polyether siloxanes are often used as an additive for producing, or for printing on, foodstuffs packaging. In this sector in particular, the substances employed are subject to very strict requirements in terms of their potential to migrate into the foodstuff. To avoid absorption of such substances into the human body, said substances must have little, if any, migration potential. Great emphasis is therefore placed, even during synthesis of the basic polyether components, on using starting materials, particularly alcoholic starters, that are toxicologically uncritical. It is of particular importance that the starting materials are non-toxic in small amounts and exhibit only little migration into the foodstuffs in case said starting materials do not undergo complete conversion in the reaction to afford the polyether and are therefore still present in the product.

It is therefore an object of the present invention to provide polyethers which meet the tight targets for additives in contact with foodstuffs and, simultaneously, are stable, homogeneous compounds bearing reactive groups allowing optional further reaction to afford the polyether siloxane.

However, many of the alcoholic starters typically employed in the DMC-catalysed production of polyethers meet the criterion of foodstuffs conformity and little migration only to a limited extent, if at all.

It has now been found that, surprisingly, the use of eugenol as starter in the DMC-catalysed production of polyethers affords products that are particularly homogeneous, have a small molar mass distribution and are unusually stable. Assessment of stability must in particular take account of the fact that using eugenol as starter results in a polyether whose terminal double bond is almost entirely preserved, i.e., is not subject to rearrangement to form isoeugenol. This has enormous advantages since the preservation of the terminal double bond makes countless further chemical reactions possible, in particular hydrosilylation with Si—H-functional siloxanes.

Surfactant polyethers based on aromatic alcohols, i.e. phenols, as starters are sufficiently well-known as described in U.S. Pat. No. 5,296,627 A and U.S. Pat. No. 6,646,091 B2 for example.

The base-catalysed alkoxylation of eugenol is also known in principle. For instance, Moustapha et al. refer in Egyptian J. Chem. 2005, 48 (3), 273-285 to the sodium metal-catalysed ethoxylation of eugenol. The product is not characterized in detail and is used merely as solvent for silver-alkene complexes in gas chromatographic analyses.

Documents EP 94386 B1 and DE 3342509 A1 describe compositions comprising eugenol-based polyethers.

The first detailed description of the alkali-catalysed alkoxylation of eugenol is described in EP 1717259 A1. In the examples reported therein, eugenol is initially charged as starter and then admixed with an alkaline catalyst such as sodium methoxide. After removal of the methanol from this catalysis step, ethylene oxide, propylene oxide and/or butylene oxide are added on at temperatures of 140-160° C. This procedure demonstrably affords pure isoeugenol-based polyethers, i.e. the eugenol allyl group undergoes quantitative rearrangement to form a 2-propenyl group during the alkaline alkoxylation. The resulting structural unit is known to those skilled in the art as isoeugenol.

In Macromol. Symp. 2010, 293, 15-19, Luinstra et al. also describe polyether-like structures where the eugenol allyl group remains stable in order to subject said structures to an ADMET polymerization. Said authors employ a substitution reaction of diethylene glycol ditosylate with two mol of eugenol. However, a eugenol-containing polymer is not described.

Polyether siloxanes bearing eugenol groups are also disclosed in principle in the scientific literature and can be obtained by three synthetic principles.

Patent application JP 11158266 A and granted patent EP 2134771 B1 describe the incorporation of eugenol into the polyether siloxane backbone by equilibration of eugenol-capped polysiloxane with hydrogen-bearing cyclic hydrosiloxanes such as $D_4H$ for example.

Patent U.S. Pat. No. 6,313,329 B1 discloses a particularly elegant method of introducing a eugenol unit into a polyether siloxane structure. This comprises initial hydrosilylation of a conventional terminally unsaturated polyether, along with methyl undecylenate, onto a SiH-bearing polysiloxane under Pt catalysis and subsequent transesterification of the polysiloxane-bonded methyl ester with the phenolic oxygen to eliminate methanol. However, the instability of the resulting phenol ester in aqueous systems that is to be expected will presumably limit the commercial utility of such products severely.

The method most commonly used, on account of it being the most advantageous to implement industrially, comprises linking the eugenol allyl group to Si—H-functional polysiloxanes by hydrosilylation, generally under catalysis by Pt compounds. For instance, granted patent EP 818495 B1 describes triazine-functional polyether siloxanes also comprising eugenol units for permanent finishing of textiles and leather.

In most cases, not only eugenol but also conventional terminally unsaturated polyethers, for example alkoxylates of allyl alcohols, are hydrosilylated onto the SiH-bearing alkylpolysiloxanes, in individual cases also with further terminally unsaturated compounds such as alkenes for example. As described in EP 1010748 B1, EP 887367 A3 and EP 845520 B1, such eugenol-comprising polyether siloxanes are used as diesel defoamers.

Cosmetic formulations constitute a further broad field of application where such polyether siloxanes are used as adjuvants, as described in EP 1260552 B1, U.S. 63/466,595 B1, EP 916689 B1 and U.S. Pat. No. 7,287,784 B2.

2011 also saw the description of polyglycerol-containing polyether siloxanes which comprise polymer-bonded eugenol units at least to some extent. Applications EP 2492301 A1 and EP 2492333 A1 describe the hydrosilylation of polyglycerol allyl ethers, resulting from eugenol-glycidol adducts, onto SiH-bearing polyether siloxanes. Such hydrophilic polysiloxanes may be used as thickeners or emulsifiers.

The disadvantage, in process engineering terms, of the prior art method of producing polyether siloxanes bearing eugenol groups and polyether groups by hydrosilylation is that two or more unsaturated products must be added onto the SiH-bearing polyether siloxane simultaneously. The significant differences in terms of both molecular weight and hydrophilic/hydrophobic character between the reactants such as eugenol and the polyether(s) to be added on (and naturally the SiH-bearing polysiloxane too) impede the production of a polyether siloxane of uniform composition in which the different reactants are evenly distributed over all siloxane chains. Inadequate commixing very rapidly results in products of inhomogeneous composition and it is imperative that this be avoided on quality and cost grounds.

The use of solvents to homogenize the reaction medium is certainly conceivable but disadvantageous in terms of cost and process engineering since the added solvent then needs to be removed again in a further process step after hydrosilylation.

It therefore appeared useful to attempt to combine the aromatic character of the hydrosilylatable eugenol with the tunable hydrophilic/hydrophobic character of a polyether in one molecule/polymer and subsequently to subject said molecule/polymer to a hydrosilylation reaction with a suitable polyether siloxane without using a solvent.

Since the alkali-catalyzed alkoxylation of eugenol demonstrably affords isoeugenol-based polyethers (vide infra), such polyethers cannot be hydrosilylated onto SiH-bearing polysiloxanes. It is common knowledge that 2-propenyl groups are not amenable to hydrosilylation.

SUMMARY

It is therefore an object of the present invention to produce hydrosilylatable alkoxylation products based on eugenol as starter, where the allyl group remains intact and thus hydrosilylatable.

It was found that, surprisingly, eugenol polyether-based polyethersiloxanes are obtainable in simple fashion by a process comprising step 1 production of eugenol-based polyethers and step 2 reaction of the SiH-functional siloxanes with at least one eugenol-based polyether from step 1 to form at least one SiC linkage.

DETAILED DESCRIPTION

In accordance with the invention, the term "eugenol-based polyether" is to be understood as meaning a polyether which is composed of at least three alkoxy units and was produced using eugenol as alcoholic starter.

The present invention provides a process for producing alkoxylation products wherein at least one epoxide is reacted with eugenol in the presence of at least one transition metal catalyst.

The transition metal catalyst is preferably a double metal cyanide catalyst.

It is very surprising that in the process according to the invention eugenol can be used as starter for alkoxylation reactions to obtain defined hydrosilylatable products since the prior art processes using eugenol have numerous disadvantages (vide infra). It is particularly surprising that eugenol, a polysubstituted aromatic and alcoholic (phenolic) starter is suitable for producing alkoxylation products having relatively narrow molecular weight distributions which are bimodal only to a minimal degree, if at all.

Extensive testing using other aromatic and alcoholic starters, for example guaiacol (CAS 90-05-1) and 2-naphthol (CAS 135-19-3), instead of eugenol in the process according to the invention show GPCs having a significantly more bimodal distribution. In both cases the intended molar mass was not achieved even according to OH number. According to MALDI-Tof analyses, the main constituent was the target molecule which had fewer moles of propylene oxide added onto it than intended. In addition, the GPC showed a high molecular weight peak which was assigned to a product of approximately twice the molar mass.

This observation would mislead those skilled in the art into thinking that a polysubstituted phenol radical as in 2-naphthol, where the phenol ring bears the fused second phenyl radical at the meta and pare positions, or a second substitutent on the phenyl radical, as is present ortho to the hydroxyl group in guaiacol, limits the usability of such starters. All the more surprising then is that 5-allylguaiacol, also known as eugenol, which bears a methoxy radical ortho to the hydroxy group of the phenol ring and an allyl radical para to the hydroxy group of the phenol ring, may again readily be used as starter in the process according to the invention. The OH number is in line with expectations and the GPC shows only the beginnings of a shoulder corresponding to relatively high molar mass. Further details are reported in the experimental section.

A particularly preferred process according to the invention comprises a first step wherein at least one epoxide is reacted with eugenol in the presence of at least one transition metal catalyst and optionally further components and a second step wherein at least one reaction of the product from step 1 with Si—H functional siloxanes is performed. It is particularly preferable when in the second step the product from step 1 and further components comprising a terminally unsaturated group are reacted with Si—H functional siloxanes.

Particular preference is given to a process for producing eugenol polyether-based polyether siloxanes wherein said process comprises step 1 production of eugenol-based polyethers and step 2 reaction of the SiH-functional siloxanes with at least one eugenol-based polyether from step 1 to form at least one SiC linkage. The thus-produced products according to the invention are of particularly outstanding suitability as a surfactant and are very good dispersants.

In accordance with the invention the term "eugenol-based polyether" is to be understood as meaning a polyether obtainable by the process according to the invention. In this process eugenol is alkoxylated such that during the reaction eugenol does not undergo rearrangement to form isoeugenol, i.e. the eugenol allyl group is not rearranged to form a 2-propylene group.

In the context of the present invention the term "alkoxylation products" or "polyethers" encompasses not only polyethers, polyetherols, polyether alcohols and polyetheresterols but also polyethercarbonate-ols, which may be used synonymously with one another. The term "poly" is not necessarily to be understood as meaning that there are a multiplicity of ether functionalities or alcohol functionalities in the molecule or polymer. It is rather merely used to indicate the presence of at least repeating units of individual monomeric building blocks or else compositions that have a relatively high molar mass and further exhibit a certain polydispersity.

The word fragment "poly" in connection with this invention encompasses not only exclusively compounds having at least 3 repeating units of one or more monomers in the molecule, but in particular also compositions of compounds that exhibit a molecular weight distribution and possess an average molecular weight of at least 200 g/mol. This definition takes into account that it is customary in the field of industry in question to refer to such compounds as polymers even if they do not appear to conform to a polymer definition as per OECD or REACH guidelines.

The term "eugenol-based polyethers" thus does not refer exclusively to alkoxylates but also encompasses reaction products of eugenol where, in addition to alkylene oxides, further monomers (co)polymerizable by ring opening are reacted, as more particularly elucidated herein below.

2. Reacting SiH-functional siloxanes with the eugenol-based polyethers from step 1 to form at least one SiC linkage.

It has been shown that the polyethers according to the invention from step 1 allow use of a smaller excess of polyether for the reaction in step 2 to achieve high SiH conversions than is required for commonly used polyethers, for example allyl-functionalized polyethers. This means that a smaller amount of free polyether remains in the product. A further important advantage over commonly used polyether siloxanes is that higher conversions are achieved.

The eugenol-based polyethers according to the invention preferably have the constitution shown in formula (I):

formula (I)

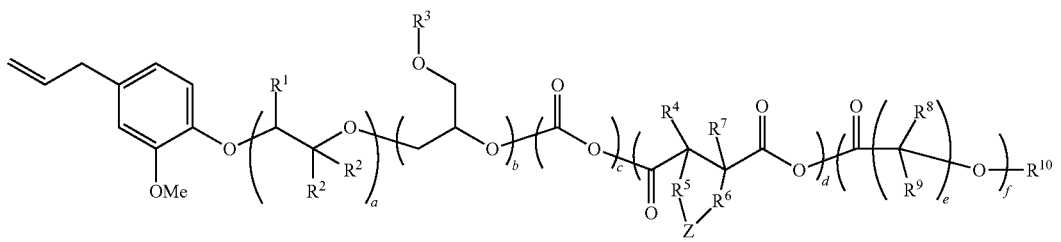

The present invention likewise claims products made by the process according to the invention that conform to formula (I) described herein below and further the use of said products as surfactants.

The present invention likewise claims products made by the process according to the invention that conform to formula (II) described herein below and further the use of said products as surfactants.

The subject-matter provided by the invention is illustratively described herein below without any intention to limit the invention to these illustrative embodiments. Where reference is made in what follows to ranges, general formulae or classes of compounds, these shall encompass not just the corresponding ranges or groups of compounds explicitly mentioned, but also all sub-ranges and sub-groups of compounds which are obtainable by extraction of individual values (ranges) or compounds. When documents are cited in the context of the present description, the contents thereof, particularly with regard to the subject-matter that forms the context in which the document has been cited, are considered in their entirety to form part of the disclosure content of the present invention. Where chemical (empirical) formulae are used in the present invention, the specified indices may be not only absolute numbers but also average values. Indices relating to polymeric compounds are preferably average values. Unless stated otherwise, percentages are figures in percent by weight. If measured values are reported herein below, these measurements, unless stated otherwise, have been conducted under standard conditions (25° C. and 1013 mbar). When average values are reported herein below, the values in question are weight averages, unless stated otherwise.

The process according to the invention for producing eugenol polyether-based polysiloxanes preferably comprises the steps of:
1. Producing polyethers wherein at least one epoxide is reacted with eugenol in the presence of at least one transition metal catalyst, where
a=1 to 1000, preferably 2 to 500, particularly preferably 3 to 500, more preferably greater than 3 to 100, especially preferably 4 to 50,
b=0 to 1000, preferably 1 to 500, more preferably greater than 1 to 200, especially preferably 0 to 50,
c=0 to 1000, preferably 1 to 100, more preferably greater than 1 to 80, especially preferably 0 to 50,
d=0 to 1000, preferably 1 to 100, more preferably greater than 1 to 80, especially preferably 0 to 50,
e=1 to 10,
f=0 to 500, preferably 1 to 300, particularly preferably 2 to 200 and especially preferably 0 to 100,
with the proviso that the sum of a+b+c+d+f is not less than 3 and
with the proviso that the groups with the indices a, b, c, d, and f are freely permutable over the molecule chain and neither of the groups with the indices c and d may follow itself or the respective other group
and with the proviso that the different monomer units and the fragments with the indices a, b and f may be in a blockwise structure with one another, where individual blocks may also occur multiple times and may be randomly distributed among one another, or else are subject to a random distribution and further are freely permutable with one another, in the sense that they may be arranged in any desired sequence, subject to the restriction that neither of the groups with the indices c and d may follow itself or the respective other group,
and where
$R^1$=independently at each occurrence a hydrogen radical or a $C_1$-$C_8$ alkyl group, preferably hydrogen, methyl or ethyl, especially preferably hydrogen,
$R^2$=independently at each occurrence a hydrogen radical, a $C_1$-$C_{20}$ alkyl group, an aryl or alkaryl group, preferably hydrogen, methyl, ethyl, octyl, decyl, dodecyl, phenyl, benzyl, more preferably hydrogen, methyl or ethyl, or
$R^1$ and one of the radicals $R^2$ may together form a ring which includes the atoms to which $R^1$ and $R^2$ are bonded, this ring preferably comprising 5 to 8 carbon atoms, $R^3$=independently at each occurrence a saturated or unsaturated, aliphatic or aromatic, hydrocarbon radical comprising 2 to 30 carbon atoms, in particular up to 24 carbon atoms, which is optionally further substituted, for example $R^3$ may also comprise a silyl, alkoxysilyl or carboxylic ester group, for example a dialkoxyalkylsilyl group or a trialkoxysilyl group, preferably a trimethoxysilyl group, a triethoxysilyl group, a dimethoxymethylsilyl group or a diethoxymethylsilyl group, $R^4$, $R^7$=independently at each occurrence hydrogen and/or an organic radical, preferably alkyl, alkenyl, alkylidene, alkoxy, aryl and/or aralkyl groups, or else optionally $R^4$ and/or $R^7$ may be absent, where, when $R^4$ and $R^7$ are absent, there is a C=C double bond in place of the radicals $R^4$ and $R^7$, the bridging fragment Z may be present or absent;
when the bridging fragment Z is absent, then $R^5$, $R^6$=independently at each occurrence hydrogen and/or an organic radical, preferably alkyl, alkenyl, alkylidene, alkoxy, aryl and/or aralkyl groups, where, when one of the radicals $R^4$ or $R^7$ is absent, the respective geminal radical (i.e. $R^5$ when $R^4$ is absent and $R^6$ when $R^7$ is absent) is an alkylidene radical, preferably methylidene (=CH$_2$);
when the bridging fragment Z is present, then $R^5$, $R^6$=hydrocarbon radicals which are bridged cycloaliphatically or aromatically via fragment Z, where Z represents a divalent alkylene or alkenylene radical which may be further substituted, $R^{10}$=independently at each occurrence a hydrogen radical or a $C_1$-$C_8$ alkyl group or an ester group —C(O)—$R^{11}$ or an acetoacetate group —C(O)—CH$_2$—C(O)—$R^{12}$ or a silyl ether group —Si($R^{13}$)$_3$ or a urethane group —C(O)—N—($R^{14}$)$_2$ where $R^{11}$, $R^{12}$, $R^{13}$=independently at each occurrence a linear or branched, saturated or unsaturated, optionally further substituted $C_1$-$C_{30}$ alkyl group, an aryl or alkaryl group, and $R^{14}$=independently at each occurrence hydrogen and/or a linear or branched, saturated or unsaturated, optionally further substituted $C_1$-$C_{30}$ alkyl group, an aryl or alkaryl group, $R^{10}$ is preferably hydrogen, a methyl group, an acetyl group or an acetoacetate group, more preferably hydrogen or an acetyl group.

The eugenol-based polyethers of general formula (I) preferably comprise at least one fragment of index a, more preferably at least two different fragments of index a.

The starter employed for the alkoxylation reaction is eugenol which, after deprotonation, can result in the fragment shown to the left of fragment a in formula (I).

Eugenol (CAS number 97-53-0) is an allyl-substituted phenol which is known by the chemical names 4-allyl-2-methoxyphenol, 4-prop-2-enyl-2-methoxyphenol, 4-allylpyrocatechol-2-methyl ether and 5-allylguaiacol. Eugenol is a natural feedstock and the main constituent of dove oil and pimento oil. Eugenol may be obtained by aqueous alkali treatment (extraction) of clove oil. The sustainable origin of the eugenol feedstock and the consequent eschewal of petrochemical feedstocks is a substantial advantage from an ecological standpoint, particularly when it is further considered that eugenol is not in competition with any use as foodstuff.

Alkylene oxides that may be used generally include all alkylene oxides known to those skilled in the art and these may be used in pure form or in any desired mixtures. Examples of alkylene oxide compounds that may be used and that result in the fragments with the index a that are specified in formula (I), include ethylene oxide, 1,2-epoxypropane (propylene oxide), 1,2-epoxy-2-methylpropane (isobutylene oxide), epichlorohydrin, 2,3-epoxy-1-propanol, 1,2-epoxybutane (butylene oxide), 2,3-epoxybutane, 2,3-dimethyl-2,3-epoxybutane, 1,2-epoxypentane, 1,2-epoxy-3-methylpentane, 1,2-epoxyhexane, 1,2-epoxycyclohexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, vinylcyclohexene oxide, (2,3-epoxypropyl)benzene, vinyloxirane, 3-phenoxy-1,2-epoxypropane, 2,3-epoxy methyl ether, 2,3-epoxy ethyl ether, 2,3-epoxy isopropyl ether, 3,4-epoxybutyl stearate, 4,5-epoxypentyl acetate, 2,3-epoxypropane methacrylate, 2,3-epoxypropane acrylate, glycidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)-1,2-epoxypropane, 3-(perfluoroethyl)-1,2-epoxypropane, 3-(perfluorobutyl)-1,2-epoxypropane, 3-(perfluorohexyl)-1,2-epoxypropane, 4-(2,3-epoxypropyl)morpholine, 1-(oxiran-2-ylmethyl)pyrrolidin-2-one. Preference is given to using ethylene oxide, propylene oxide, butylene oxide and styrene oxide. Particular preference is given to using ethylene oxide and propylene oxide. In a very particularly preferred embodiment, ethylene oxide and propylene oxide are employed in a molar ratio of from 1:3 to 3:1, preferably from 1:2 to 1:1.

Glycidyl ethers that may be used and that result in the fragments with the index b that are specified in formula (I) generally include all glycidyl ethers known to those skilled in the art and these may be employed either in pure form or in any desired mixtures.

Preference is given to methyl, ethyl, propyl, butyl, isobutyl, tert-butyl, 2-pentyl, 3-pentyl, 2-methylbutyl, 3-methylbutyl, 2-methyl-2-butyl, 3-methyl-2-butyl, 2,2-dimethylpropyl, hexyl, heptyl, octyl, 2-ethylhexyl, 2-propylheptyl, 2-butyloctanyl, 2-methylundecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyt, isononanyl, isotridecyl, isomyristyl, isostearyl, 2-octyldodecyl, triphenylmethyl, C(O)—(CH$_2$)$_5$—C—(CH$_3$)$_3$ (neodecanoic acid radical), $C_{12}/C_{14}$ alkyl, phenyl, cresyl, tert-butylphenyl or benzyl glycidyl ether and also to 3-glycidyloxypropyltrimethoxysilane, 3-glycidyloxypropyltriethoxysilane, 3-glycidyloxypropyltripropoxysilane, 3-glycidyloxypropyltriisopropoxysilane, bis(3-glycidyloxypropyl)dimethoxysilane, bis(3-glycidyloxypropyl)diethoxysilane, 3-glycidyloxyhexyltrimethoxysilane, 3-glycidyloxyhexyltriethoxysilane, 3-glycidyloxypropylmethyldimethoxysilane, 3-glycidyloxypropylethyldiethoxysilane. Particular preference is given to 2-ethylhexyl, neodecanoyl, $C_{12}/C_{14}$ alkyl, cresyl, tert-butylphenyl glycidyl ether and very particular preference is given to tert-butylphenyl or cresyl glycidyl ether.

Glycidyl ethers that may be used also include polyfunctional glycidyl ethers such as 1,4-butanediol diglycidyl ether, 1,6-hexanediol diglycidyl ether, cyclohexanedimethanol diglycidyl ether, neopentyl glycol diglycidyl ether, polyethylene glycol diglycidyl ether, polypropylene glycol diglycidyl ether, polyglycerol-3 glycidic ether, glycerol triglycidic ether, trimethylolpropane triglycidyl ether or pentaerythritol tetraglycidyl ether and these allow for the introduction also of branched structural elements into the final alkoxylation product of formula (I).

The fragments with the index c that are specified in formula (I) may be introduced into the polyether by carrying out a copolymerization with $CO_2$.

Cyclic anhydrides that may be used and that result in the fragments with the index d that are specified in formula (I)

generally include all cyclic anhydrides known to those skilled in the art and these may be employed either in pure form or in any desired mixtures. Saturated, unsaturated or aromatic cyclic dicarboxylic anhydrides that may preferably be used include succinic anhydrides, oct(en)yl-, dec(en)yl- and dodec(en)ylsuccinic anhydride, maleic anhydride, itaconic anhydride, glutaric anhydride, adipic anhydride, citraconic anhydride, trimellitic anhydride, phthalic anhydride, hexahydro-, tetrahydro-, dihydro-methylhexahydro- and methyltetrahydrophthalic anhydride and also polyfunctional anhydrides such as pyromellitic dianhydride, benzophenone-3,3',4,4'-tetracarboxylic dianhydride, 1,2,3,4-butanetetracarboxylic dianhydride and free-radically polymerized homo- or copolymers of maleic anhydride with ethylene, isobutylene, acrylonitrile, vinyl acetate or styrene.

Particular preference is given to succinic anhydride, maleic anhydride, phthalic anhydride and hexahydrophthalic anhydride, particularly maleic anhydride and phthalic anhydride.

Lactones that may be used and that result in the fragments with the index f that are specified in formula (I) generally include all lactones known to those skilled in the art and these may be employed either in pure form or in any desired mixtures.

Preference is given to valerolactones or caprolactones and these may both be unsubstituted or substituted with alkyl groups, preferably methyl groups. Preference is given to ε-caprolactone or δ-valerolactone, particularly ε-caprolactone.

The alkoxylation of OH-functional starter compounds may be performed under base, acid, or transition metal catalysis. As mentioned at the outset, basic catalysts cannot be used in the alkoxylation of eugenol since this results in rearrangement to form isoeugenol.

In step 1 of the process according to the invention for producing eugenol-based polyethers, the alkoylation of eugenol may be performed in the presence of transition metal catalysts. The alkoxylation is preferably performed in the presence of double metal cyanide (DMC) catalysts.

The production and use of DMC catalysts for alkoylation reactions has been known since the 1960s and is outlined in U.S. Pat. No. 3,427,256, U.S. Pat. No. 3,427,334, U.S. Pat. No. 3,427,335, U.S. Pat. No. 3,278,457, U.S. Pat. No. 3,278,458 and U.S. Pat. No. 3,278,459 for example. Even more effective DMC catalysts, specifically zinc-cobalt hexacyano complexes, have been developed in the meantime, for example in U.S. Pat. No. 5,470,813, U.S. Pat. No. 5,482,908 and EP 1276563 B1.

Double metal cyanide catalysts (DMC catalysts) used in the process according to the invention are preferably those described in EP 1276563 B1, particularly the DMC catalysts described therein as preferable or particularly preferable.

The two steps of the process according to the invention are described in more detail herein below.

Step 1:

The first step of the process according to the invention for producing eugenol-based polyethers comprises carrying out a DMC-catalyzed alkoxylation of the starter eugenol with compounds comprising epoxide groups (alkylene oxides and glycidyl ethers). All process steps may be performed at identical or different temperatures. The alkoxylation reaction of the process according to the invention is started by initially charging the starter mixture consisting of eugenol and the double metal cyanide catalyst into the reactor.

The catalyst concentration in the reaction mixture is preferably from >0 to 1000 wppm (mass ppm), preferably from >0 to 500 wppm, more preferably from 0.1 to 400 wppm and most preferably from 10 to 300 wppm. This concentration is based on the total mass of the alkoxylation products formed.

The catalyst is preferably metered into the reactor only once. The amount of catalyst is to be set such that sufficient catalytic activity is provided for the process. The catalyst may be metered in as solid or in the form of a catalyst suspension. The suspension medium used may be either an inert solvent or, advantageously, eugenol or alternatively a mixture of both components.

The starter mixture of starter (eugenol), DMC catalyst and any suspension medium that is initially charged into the reactor to start the reaction may be pretreated by stripping according to the teaching of WO 98/52689 before metered addition of monomer is commenced. This comprises admixing an inert gas with the reaction mixture via the reactor feed and removing relatively volatile components from the reaction mixture by application of negative pressure using a vacuum plant connected to the reactor system. In this simple fashion, substances which may inhibit the catalyst, such as lower alcohols or water for example, can be removed from the reaction mixture. The addition of inert gas and the simultaneous removal of the relatively volatile components may be advantageous particularly at reaction start-up, since the addition of the reactants, or secondary reactions, may also introduce inhibiting compounds into the reaction mixture.

Propylene oxide or at least one other epoxide compound is metered into the initially charged starter mixture. To start the alkoxylation reaction and to activate the double metal cyanide catalyst, generally only some of the total amount of epoxide to be metered in is initially added. In this start phase the molar ratio of epoxide to eugenol is preferably between 0.1:1 to 15:1, preferably between 0.2:1 to 10:1, in particular between 0.4:1 to 5:1.

The start of the exothermic reaction may be detected by monitoring pressure and/or temperature for example. In the case of gaseous alkylene oxides a sudden drop in pressure in the reactor indicates that the alkylene oxide is being incorporated, that the reaction has thus started and that the end of the start phase has been reached. In the case of non-gaseous alkylene oxides and glycidyl ethers/esters, onset of the reaction is indicated by the evolution of heat which sets in.

After the start phase, i.e. after initialization of the reaction, further alkylene oxide may be metered in depending on the molar mass sought. It is alternatively possible also to add on any desired mixture of different alkylene oxide compounds and glycidyl ethers/esters and these may also be added on separately and successively in any desired sequence.

The reaction may be performed in an inert solvent, for example to reduce the viscosity of the reaction mixture. Suitable inert solvents are, for example, hydrocarbons, particularly toluene, xylene or cyclohexane. However, this is less preferred.

In the products according to the invention, the molar ratio of the sum of the epoxides metered in, including the epoxides added in the start phase, is preferably 1 to $10^5$:1, in particular 1 to $10^3$:1, based on the starter compound employed.

The adding-on of the alkylene oxide compounds is preferably carried out at a temperature of from 60° C. to 250° C., more preferably at a temperature of from 90° C. to 160° C., in particular at a temperature of 120° C. to 150° C.

The pressure at which the alkoxylation is carried out is preferably from 0.02 to 100 bar, more preferably from 0.05 to 20 bar and in particular from 0.2 to 2 bar absolute.

Carrying out the alkoxylation substantially at negative pressure allows the reaction to be carried out very safely. The alkoxylation may optionally be carried out in the presence of an inert gas (e.g. nitrogen) or—for producing polyethercarbonates—in the presence of carbon dioxide in this case also at a positive pressure of from preferably 1 to 20 bar absolute.

The lactones or cyclic anhydrides that may be used for producing ester-modified polyethers may either be added to the mixture of eugenol and DMC catalyst as early as in the start phase or introduced at a later point in time, simultaneously with the metered addition of alkylene oxide. The comonomers mentioned can also each be metered into the reactor in alternating succession with alkylene oxides.

Here, the molar ratio of the alkylene oxide monomers to cyclic anhydrides may be varied. Based on anhydrides, at least equimolar amounts of alkylene oxide monomers are typically employed. Preference is given to using the alkylene oxides in a molar excess in order to ensure full anhydride conversion.

Lactones may be added during the alkoxylation either in stoichiometric deficiency or excess based on the alkylene oxide monomers.

In one particular embodiment of step 1 of the process according to the invention it may be advantageous to introduce further starters to the reaction mixture during the course of the alkoxylation.

The metered addition of further amounts of eugenol may, for instance, be carried out at a particular point in time or else at two or more points in time in portionwise fashion. This may comprise distributing the total amount of eugenol evenly over the desired number of portions but it is also possible to divide the total amount over portions of different sizes.

In addition to the above-described discontinuous addition of eugenol, the addition may also be carried out continuously. This may comprise carrying out the continuous addition once during the alkoxylation reaction or two or more times. The addition of eugenol is preferably carried out continuously. It is particularly preferable when the addition of eugenol is carried out once and then in continuous fashion.

After the monomer addition and any post-reaction to complete the monomer conversion, any residues of unreacted monomer and any further volatile constituents are removed, typically by vacuum distillation, gas stripping or other deodorization methods. Volatile secondary components may be removed either discontinuously (batchwise) or continuously. In the DMC catalysis-based process according to the invention, filtration may normally be eschewed.

The terminal hydroxyl groups of the eugenol-based polyethers may remain free or may be modified completely or to an extent in order that optimal compatibility in the later application matrix may be achieved.

Conceivable modifications include not only further condensation or addition reactions with isocyanates for example, but also transesterifications, esterifications and etherifications.

In one preferred embodiment the reaction may be carried out with silanol-forming species or monoisocyanates, preferably with a monoisocyanate, as described in application EP 2415797 (US 2012/029090).

Suitable monoisocyanates that may be employed include, in the simplest case, alkyl, aryl and arylalkyl isocyanates. Methyl, ethyl, butyl, hexyl, octyl, dodecyl, toluyl and stearyl isocyanate may preferably be employed, butyl isocyanate being particularly preferred. Difunctional isocyanates such as MDI, IPDI and TDI may also be employed but this is less preferred.

In a further preferred embodiment the reaction may be carried out as a transesterification with acetoacetate esters such as ethyl acetoacetate or tert-butyl acetoacetate for example. Such transesterifications are advantageously performed under the mild reaction conditions of 90-140° C. which generally result in good conversions even without a catalyst. As required, acetoacetate groups may also be introduced by reacting the polyether with diketene.

It is preferable when the terminal hydroxyl groups remain free or are acetylated or methylated or are end-capped with carbonates or acetoacetates. It is particularly preferable when the terminal OH groups remain free or are acetylated.

The chemical modifications of the free hydroxyl groups of the eugenol-based polyethers may be chemically modified with the Si—H-functional polysiloxane either before or after the hydrosilylation reaction.

It is preferable when the polydispersity (Mw/Mn) of the eugenol-based polyethers of formula (I), determined by GPC, is <2.5, preferably <2.0 and more preferably from >1.05 to <1.5.

The eugenol-based polyethers of formula (I) according to the invention may be used in a wide variety of applications including, in particular, as surfactants and more particularly as dispersants.

Step 1 of the process may in principle be carried out independently and without subsequent process step 2. The present invention likewise provides the process products of step 1. However, it is preferable when the process products of step 1 are further reacted in step 2.

Step 2:

Step 2 of the process according to the invention is preferably performed as a hydrosilylation. This comprises forming an SiC linkage between the terminally unsaturated, eugenol-based polyethers from step 1 and SiH-functional siloxanes under noble metal catalysis.

The provision of the SiH-functional siloxanes for process step 2 is preferably effected by performing the prior art process of equilibration, preferably over a sulphonated resin. The equilibration of the branched or linear, optionally hydrosilylated poly(organo)siloxanes having end and/or pendant SiH functions is described in the prior art, for example in the documents EP 1 439 200 A1, DE 10 2007 055 485 A1 and DE 10 2008 041 601. These documents are hereby incorporated by reference and are considered to form part of the disclosure of the present invention.

The preparation of the preferably employed silicone polyether block copolymers may be effected by a prior art process wherein branched or linear polyorganosiloxanes having terminal and/or pendant SiH functions are reacted with an unsaturated polyether or a polyether mixture composed of at least two unsaturated polyethers.

The reaction is preferably performed as a noble metal-catalysed hydrosilylation, as described in EP 1 520 870 for example. Document EP 1 520 870 is hereby incorporated by reference and is thus considered to form part of the disclosure content in respect of step 2 of the process according to the present invention. The noble metal catalyst used is preferably a catalyst comprising platinum.

The reaction according to step 2 may be performed in the presence or absence of saturated polyethers. Process step 2 is preferably carried out in the presence of saturated polyethers. It is possible to carry out process step 2 in the presence of further solvents distinct from saturated polyethers. It is preferable when no solvents distinct from saturated polyethers are used. Process step 2 may also be carried out in the presence of acid-buffering agents. However, said step is preferably carried out in the absence of acid-buffering agents. It is preferable when the process step is carried out in the absence of acid-buffering agents and solvents distinct from saturated polyethers and it is particularly preferable when step 2 comprises reacting exclusively eugenol-based polyethers.

Step 2 may employ not only the terminally unsaturated eugenol-based polyethers from step 1 but also further linear and/or branched, unsaturated polyether compounds distinct therefrom and also further terminally unsaturated organic compounds. This can be of particular advantage to enable the compatibility of the eugenol polyether-comprising polysiloxanes to be tailored to the particular application matrix.

Such polyethers are advantageously allyl polyethers obtainable by any prior art process.

Such terminally unsaturated organic compounds am preferably alkene or alkyne compounds which may bear further substituents. Examples of compounds that may be used include allyl glycidic ether, glycerol monoallyl ether, allylanisole, allylphenol, eugenol, hexenol, hexadecene and methyl undecylenate, particular preference being given to hexadecene, eugenol and glycerol monoallyl ether.

It is possible to use exclusively eugenol-based polyethers or else any desired mixtures of these eugenol-based polyethers with terminally unsaturated compounds.

The formula (II) polysiloxane compounds according to the invention $$M_g M'_h D_i D'_j D''_m T_k Q_l \quad \text{formula (II)}$$

are those where
$M=[R^{15}_3 SiO_{1/2}]$
$M'=[R^{16} R^{15}_2 SiO_{1/2}]$
$D=[R^{15}_2 SiO_{2/2}]$
$D'=[R^{16} R^{15} SiO_{2/2}]$
$D''=[R^{17} R^{15} SiO_{2/2}]$
$T=[R^{15} SiO_{3/2}]$
$Q=[SiO_{4/2}]$
$g=0\text{-}20$, preferably 0-10, more preferably 2,
$h=0\text{-}20$, preferably 0-10, more preferably 0,
$i=0\text{-}1000$, preferably 0-500, more preferably 0-200,
$j=0\text{-}20$, preferably 1-15, more preferably 1-10,
$k=0\text{-}20$, preferably 0-10, more preferably 0,
$l=0\text{-}20$, preferably 0-10, more preferably 0,
$m=0\text{-}20$, preferably 1-15, more preferably 1-10,
with the proviso that the sum of $g+h+i+j+k+l+m$ is not less than 3 and that the sum of $h+j\geq 1$
and
$R^{15}$=independently at each occurrence identical or different $C_1$-$C_{16}$ hydrocarbon radicals, or H, preferably methyl, ethyl or phenyl, more preferably methyl,
$R^{16}$=independently at each occurrence identical or different polyether radicals, with the proviso that at least 10% of the radicals are eugenol-based polyether radicals; preferably the eugenol-based polyether radicals correspond to general formula (III)

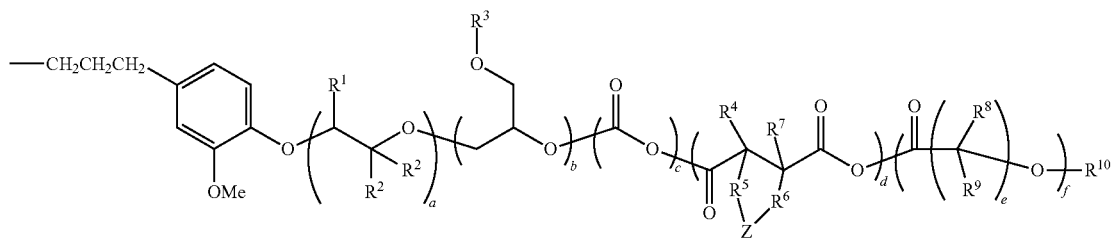

formula (III)

It is preferable when the molar ratio used of the unsaturated eugenol-based polyethers to the unsaturated compounds is from 0.001 to 100 mol %, preferably from 10 to 100 mol % and more preferably from 20 to 80 mol % based on the sum of eugenol-based polyethers and unsaturated compounds.

The process according to the invention may be used to produce the polysiloxane compounds described herein below for example.

and preferred non-eugenol-based polyethers correspond to radicals of general formula (IV),

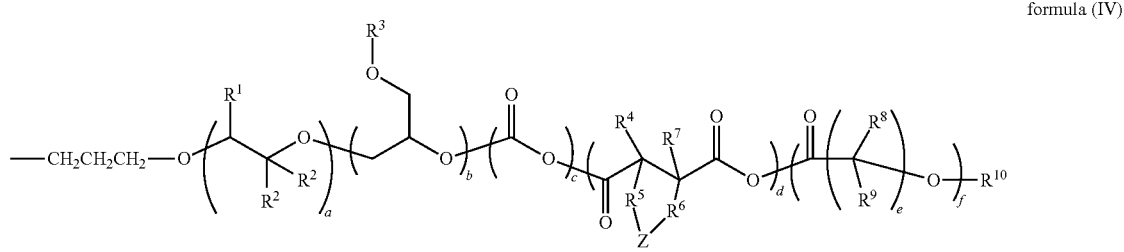

formula (IV)

where the indices a-f and the radicals $R^1$-$R^{10}$ are as defined above, $R^{17}$=independently at each occurrence identical or different $C_1$-$C_{16}$ hydrocarbon radicals which also comprise heteroatoms and may be further substituted, preferably concerned are SiC-linked radicals resulting from allyl glycidic ether, glycerol monoallyl ether, allylanisole, eugenol, hexenol, hexadecene and methyl undecylenate, more preferably hexadecene, eugenol and glycerol monoallyl ether.

Compounds of general formula (II) that comprise not only eugenol-based polyethers of formula (III) but also further non-eugenol-based polyethers of formula (IV) are advantageously employed in systems requiring compatibility tailoring; when the polyether siloxane comprises exclusively eugenol-based polyether structures, any necessary tailoring of compatibility may also be achieved via the intrinsic structure of the eugenol-based polyether.

The polysiloxane compounds according to the invention are preferably obtainable by the above-described process according to the invention.

The formula (II) polysiloxane compounds according to the invention and the compositions according to the invention may be used in a wide variety of applications, their use as surfactants being a particular example.

The present invention thus further provides for the use of products of formula (I) as a surfactant. The present invention likewise provides for the use of products of formula (I) as a dispersing additive.

In addition, the present invention further provides for the use of products of formula (II) as a surfactant. The present invention likewise provides for the use of products of formula (II) as a dispersing additive.

Measurement Methods:

Parameters or measured values are preferably determined by the methods described herein below. In particular, these methods are used in the examples of the present intellectual property right.

MALDI-Tof analyses were carried out using a Shimadzu Biotech Axima (CFR 2.8.420081127) instrument in reflectron mode. Pulse extraction was optimized for a molecular weight of 1000 g/mol. The sample was dissolved in chloroform (4-5 g/l) and 2 µL of this solution were applied to graphite as matrix.

In the context of the present invention, weight-average and number-average molecular weights for the eugenol-based polyethers produced and the eugenol polyether-comprising polysiloxanes are determined by gel permeation chromatography (GPC), determination being calibrated against a polypropylene glycol standard in the case of said polyethers and against a polystyrene standard in the case of said polysiloxanes. GPC was performed using an Agilent 1100 instrument fitted with an RI detector and an SDV 1000/10000 Å column combination consisting of an 0.8×5 cm pre-column and two 0.8×30 cm main columns at a temperature of 30° C. and a flow rate of 1 mL/min (mobile phase: THF). The sample concentration was 10 g/i and the injection volume was 20 µL.

Wet chemistry analysis was performed according to international standard methods: Iodine number (IN; DGF C-V 11 a (53); acid number (AN; DGF C-V 2); OH number (ASTM D 4274 C).

The polydispersity index (PDI) is the quotient of $M_w$ divided by $M_n$ (PDI=$M_w/M_n$).

The present invention is illustratively described in the examples which follow without any intention of limiting the invention, whose scope is determined by the entire description and the claims, to the embodiments referred to in the examples.

Example 1: Synthesis of a Eugenol-Based Polyether (Inventive)

A 5 liter autoclave was initially charged with 351 g of eugenol and said eugenol was admixed with 100 ppm (based on the total batch) of a zinc hexacyanocobaltate double metal cyanide catalyst. The reactor was inertized by charging with nitrogen to a pressure of 3 bar and subsequent decompression to atmospheric pressure. This operation was repeated twice more. While stirring, the reactor contents were heated to 100° C. and evacuated to about 20 mbar to remove volatile components. After 30 minutes, the temperature was elevated to 130° C. and 100 g of propylene oxide were metered into the evacuated reactor to activate the catalyst. The internal pressure initially rose to about 0.8 bar. The pressure began to drop slowly and had dropped to −0.1 bar after about 7 minutes. A further 50 g of PO were then metered in which caused the pressure to rise to 0.8 bar once more. After 12 minutes, the pressure had dropped to −0.1 bar and a further 50 g of PO were metered in. Once the pressure had dropped to 0 bar, slow, continuous metered addition of PO was commenced. After a total of 210 g of PO had been added, the pressure dropped suddenly to −0.9 bar which was taken to indicate true onset of the reaction. 38 g of propylene oxide were then metered in continuously over about 10 minutes. This was followed by one hour of post-reaction. A mixture of 1110 g of EO and 1290 g of PO were then metered in continuously such that the temperature remained constant. After a further half hour of post-reaction the batch was deodorized by application of pressure (P<20 mbar) to remove residues of unconverted alkylene oxide. 500 ppm of ANOX 20 AM were subsequently stirred in over 15 minutes. This afforded a colourless to yellowish product having an OH number of 40.2 mg KOH/g and an AN of 0.1 mg KOH/g. The molecular weight according to OH number was 1395 g/mol. According to GPC, $M_w$=1394 g/mol, $M_n$=1316 g/mol and the PDI was 1.06.

Example 2: Synthesis of a Eugenol-Based Polyether (Inventive)

A 5 liter autoclave was initially charged with 164.2 g of eugenol and said eugenol was admixed with 100 ppm (based on the total batch) of a zinc hexacyanocobaltate double metal cyanide catalyst. The reactor was inertized by charging with nitrogen to a pressure of 3 bar and subsequent decompression to atmospheric pressure. This operation was repeated twice more. While stirring, the reactor contents were heated to 100° C. and evacuated to about 20 mbar to remove volatile components. After 30 minutes, the temperature was elevated to 130° C. and 70 g of propylene oxide were metered into the evacuated reactor to activate the catalyst. The internal pressure initially rose to about 0.8 bar. The pressure began to drop slowly and had dropped to −0.4 bar after about 30 minutes. Slow, continuous addition of propylene oxide was then commenced. After addition of a further 56 g of PO the pressure rose to 0.7 bar and then dropped suddenly to −0.8 bar after addition of a total of 200 g of PO and this sudden drop was taken to indicate true onset of the reaction. 1673 g of propylene oxide were then metered in continuously such that the temperature remained constant. After a further half hour of post-reaction the batch was deodorized by application of pressure (P<20 mbar) to remove residues of unconverted alkylene oxide. 500 ppm of ANOX 20 AM were subsequently stirred in over 15 minutes. This afforded a colourless to yellowish product having an OH number of 26.8 mg KOH/g and an AN of 0.1 mg KOH/g. The molecular weight according to OH number was 2093 g/mol. According to GPC, $M_w$=1957 g/mol, $M_n$=1830 g/mol and the PDI was 1.07.

Example 3: Synthesis of a Eugenol-Based Polyether (Inventive)

A 5 liter autoclave was initially charged with 544 g of eugenol and said eugenol was admixed with 200 ppm (based on the total batch) of a zinc hexacyanocobaltate double metal cyanide catalyst. The reactor was inertized by charging with nitrogen to a pressure of 3 bar and subsequent decompression to atmospheric pressure. This operation was repeated twice more. While stirring, the contents of the reactor were heated to 80° C. and evacuated to about 20 mbar to remove volatile components. After 30 minutes, the temperature was elevated to 140° C. and 80 g of propylene oxide were metered into the evacuated reactor to activate the catalyst. The internal pressure initially rose to about 0.6 bar. The pressure began to drop slowly and had dropped to −0.2 bar after about 10 minutes. A further 74 g of PO were then metered in which caused the pressure to drop slowly to −0.8 bar over 60 minutes. Metered addition of a mixture of 612 g of ethylene oxide and 691 g of propylene oxide was then commenced. 110 g of the EO/PO mixture were metered in over 30 minutes causing the pressure in the reactor to rise to 0.5 bar. A further 54 g of the mixture were then added over 15 minutes. The pressure rose to 1.5 bar before dropping suddenly to −0.5 bar which was taken to indicate true onset of the reaction. The remaining alkylene oxide mixture (1139 g) was then continuously metered in over 40 minutes. After a further half hour of post-reaction the batch was deodorized by application of pressure (P<20 mbar) to remove residues of unconverted alkylene oxide. 500 ppm of ANOX 20 AM were subsequently stirred in over 15 minutes. This afforded a colourless to yellowish product having an OH number of 81.8 mg KOH/g and an AN of 0.1 mg KOH/g. The molecular weight according to OH number was 685 g/mol. According to GPC, $M_w$=640 g/mol, $M_n$=583 g/mol and the PDI was 1.10.

Example 4: Synthesis of a Eugenol-Based Polyether (Inventive)

A 5 liter autoclave was initially charged with 503 g of eugenol and said eugenol was admixed with 100 ppm (based on the total batch) of a zinc hexacyanocobaltate double metal cyanide catalyst. The reactor was inertized by charging with nitrogen to a pressure of 3 bar and subsequent decompression to atmospheric pressure. This operation was repeated twice more. While stirring, the contents of the reactor ware heated to 120° C. and evacuated to about 20 mbar to remove volatile components. After 30 minutes, the temperature was elevated to 130° C. and 70 g of propylene oxide were metered into the evacuated reactor to activate the catalyst. The internal pressure initially rose to about 0.5 bar. The pressure began to drop slowly and had dropped to −0.9 bar after about 20 minutes. 196 g of PO were then slowly metered in over a period of 40 minutes which caused the pressure to rise to 0.5 bar After thirty minutes of post-reaction the pressure dropped to −0.4 bar and metered addition of a mixture of 1078 g of EO and 1154 g of PO was commenced. 60 g of the EO/PO mixture were metered in over 30 minutes which caused the pressure in the reactor to initially rise to a slight positive pressure and then drop suddenly to −0.9 bar which was taken to indicate true onset of the reaction. The remaining alkylene oxide mixture (2172 g) was then continuously metered in over 75 minutes. After a further half hour of post-reaction the batch was deodorized by application of pressure (P<20 mbar) to remove residues of unconverted alkylene oxide. 500 ppm of ANOX 20 AM were subsequently stirred in over 15 minutes. This afforded a colourless to yellowish product having an OH number of 51.6 mg KOH/g and an AN of 0.1 mg KOH/g. The molecular weight according to OH number was 1087 g/mol. According to GPC, $M_w$=1012 g/mol, $M_n$=945 g/mol and the PDI was 1.07.

Example 5: Acetylation of a Eugenol-Based Polyether from Example 1 (Inventive)

Under protective gas, a 2 liter three-necked flask fitted with a dropping funnel and a reflux cooler was initially charged with the eugenol-based polyether from Example 1 and a catalytic amount of concentrated hydrochloric acid and the resulting mixture was heated. Acetic anhydride was then added slowly. Once addition was complete the mixture was stirred for a further 4 h. Any residual acid was then distilled off to afford a colourless to yellowish product having an OH number of 0.1 mg KOH/g and an AN of 0.1 mg KOH/g. Within the bounds of analytical measurement inaccuracies of two independent measurements the OH number suggests that quantitative acetylation of the terminal OH groups of the polyether has been achieved. Within the bounds of measurement inaccuracies the GPC remained unchanged compared to the polyether from Example 1. According to GPC, $M_w$=1424 g/mol, $M_n$=1316 g/mol and the PDI was 1.08.

Example 6: Synthesis of a 2-Naphthol-Based Polyether (Comparative Example)

The reaction was performed analogously to Example 2. 144.1 g of 2-naphthol and 200 ppm (based on the total batch) of a zinc hexacyanocobaltate double metal cyanide catalyst were initially charged and 1856 g of PO were added on. Portionwise addition of 215 g of PO was necessary prior to onset of the reaction. This caused the pressure to rise to a maximum of 2 bar before it dropped to −0.9 bar over 12 minutes after addition of the final portion of PO. The remaining propylene oxide was metered in over 75 minutes. This afforded a colourless to yellowish product having an OH number of 31.8 mg KOH/g and an AN of 0.2 mg KOH/g. The molecular weight according to OH number was 1764 g/mol. According to GPC, $M_w$=1945 g/mol, $M_n$=1730 g/mol and the PDI was 1.12.

Example 7: Synthesis of a Gualacol-Based Polyether (Comparative Example)

The reaction was performed analogously to Example 2. 125 g of guaiacol and 100 ppm (based on the total batch) of a zinc hexacyanocobaltate double metal cyanide catalyst were initially charged and 1894 g of PO were added on. This afforded a colourless to yellowish product having an OH number of 31.7 mg KOH/g and an AN of 0.1 mg KOH/g. The molecular weight according to OH number was 1769 g/mol. According to GPC, $M_w$=1936 g/mol, $M_n$=1667 g/mol and the PDI was 1.16.

TABLE 1

Summary of the analytical data from Examples 2, 6 and 7

| Product | GPC | | | | M | |
|---|---|---|---|---|---|---|
| | Mw [g/mol] | Mn [g/mol] | PDI | I* [%] | (theory)** [g/mol] | M*** [g/mol] |
| Example 2 (inventive) | 1957 | 1830 | 1.08 | 8 | 2038 | 2093 |
| Example 6 (comparative) | 1945 | 1730 | 1.12 | 30 | 2000 | 1764 |
| Example 7 (comparative) | 1936 | 1667 | 1.16 | 18 | 2000 | 1769 |

*Proportion of high molecular weight compound determined by integration of the GPC signal;
**Theoretical molecular weight according to starting weights;
***Molecular weight resulting from determined OH number.

Example 8: Production of a Polyether Siloxane with Eugenol-Based Polyether (Inventive)

In a 500 mL three-necked flask with a thermometer, reflux cooler and KPG stirrer, 79.0 g of a SiH-functional siloxane of general formula $[Me_2SiHO_{1/2}]_2[Me_2SiO_{2/2}]_{37}[MeSiHO_{2/2}]_3$ were admixed with 171 g of the eugenol-based polyether from Example 4. The mixture was stirred and heated to 90° C. The reaction mixture was subsequently admixed with 0.17 g of a solution of Karstedrs catalyst (CAS number 68478-92-2) in xylene (1.5% Pt). An exothermic reaction was observed. The mixture was stirred for two hours. This afforded a yellowish, clear, monophasic liquid.

Example 9: Production of a Polyether Siloxane with Eugenol-Based Polyether (Inventive)

In a 500 mL three-necked flask with a thermometer, reflux cooler and KPG stirrer, 44.3 g of a SiH-functional siloxane of general formula $[Me_3SiO_{1/2}]_2[Me_2SiO_{2/2}]_{13}[MeSiHO_{2/2}]_5$ were admixed with 205.7 g of the eugenol-based polyether from Example 4. The mixture was stirred and heated to 90° C. The reaction mixture was subsequently admixed with 0.17 g of a solution of Karstedrs catalyst (CAS number 68478-92-2) in xylene (1.5% Pt). An exothermic reaction was observed. The mixture was stirred for two hours. This afforded a yellowish, clear, monophasic liquid.

Example 10: Production of a Polyether Siloxane with Eugenol-Based Polyether and Non-Eugenol-Based Polyether (Inventive)

In a 500 mL three-necked flask with a thermometer, reflux cooler and KPG stirrer, 40.0 g of a SiH-functional siloxane of general formula $[Me_3SiO_{1/2}]_2[Me_2SiO_{2/2}]_{13}[MeSiHO_{2/2}]_5$ were admixed with 94.8 g of the eugenol-based polyether from Example 4 and 132.7 g of a polyether of general formula $CH_2=CHCH_2O-(CH_2CH_2O)_{13}(CH_2CH(CH_3)O)_{13}Me$. The mixture was stirred and heated to 90° C. The reaction mixture was subsequently admixed with 0.18 g of a solution of Karstedt's catalyst (CAS number: 68478-92-2) in xylene (1.5% Pt). An exothermic reaction was observed. The mixture was stirred for two hours. This afforded a yellowish, clear, monophasic liquid.

Example 11: Production of a Polyether Siloxane with Eugenol-Based Polyether (Inventive)

In a 500 mL three-necked flask with a thermometer, reflux cooler and KPG stirrer, 112.0 g of a SiH-functional siloxane of general formula $[Me_2SiHO_{1/2}]_2[Me_2SiO_{2/2}]_{26}$ were admixed with 138.0 g of the eugenol-based polyether from Example 4. The mixture was stirred and heated to 90° C. The reaction mixture was subsequently admixed with 0.17 g of a solution of Karstedt's catalyst (CAS number: 68478-92-2) in xylene (1.5% Pt). An exothermic reaction was observed. The mixture was stirred for two hours. This afforded a yellowish, clear, monophasic liquid.

Example 12: Production of a Polyether Siloxane with Eugenol-Based Polyether (Inventive)

In a 500 mL three-necked flask with a thermometer, reflux cooler and KPG stirrer, 32.0 g of a SiH-functional siloxane of general formula $[Me_3SiO_{1/2}]_2[MeSiHO_{2/2}]_1$ were admixed with 218.0 g of the eugenol-based polyether from Example 4. The mixture was stirred and heated to 90° C. The reaction mixture was subsequently admixed with 0.2 g of a solution of Karstedt's catalyst (CAS number 68478-92-2) in xylene (1.5% Pt). An exothermic reaction was observed. The mixture was stirred for five hours. This afforded a yellowish, clear, monophasic liquid.

Example 13: Production of a Polyether Siloxane with Eugenol-Based Polyether and Non-Eugenol-Based Polyether (Inventive)

In a 500 mL three-necked flask with a thermometer, reflux cooler and KPG stirrer, 150 g of a SiH-functional siloxane of general formula $[Me_3SiO_{1/2}]_2[Me_2SiO_{2/2}]_{113}[MeSiHO_{2/2}]_5$ were admixed with 45.9 g of the eugenol-based polyether from Example 4 and 55.1 g of a polyether of general formula $CH_2=CHCH_2O-(CH_2CH_2O)_{13}(CH_2CH(CH_3)O)_2H$. The mixture was stirred and heated to 90° C. The reaction mixture was subsequently admixed with 0.15 g of a solution of Karstedt's catalyst (CAS number: 68478-92-2) in xylene (1.5% Pt). An exothermic reaction was observed. The mixture was stirred for two hours. This afforded a yellowish, slightly cloudy liquid.

Example 14: Production of a Polyether Siloxane with Eugenol-Based Polyether and Dodecene (Inventive)

164 g of a SiH-functional siloxane of general formula $Me_3SiO[SiMe_2O]_{70}[SiHMeO]_{20}SiMe_3$ were initially charged into a 1 L three-necked flask. Said siloxane was heated to 80° C. and admixed with 6 mg of Pt in the form of Karstedt's catalyst. Subsequently, 44 g of 1-dodecene were slowly added dropwise. 424 g of the polyether from Example 4 were then metered in slowly. The reaction mixture was stirred at 80° C. for a further 2 h. This afforded a clear, homogeneous alkyl- and polyether-modified siloxane.

Example 15a: Production of a Polyether Siloxane with Eugenol-Based Polyether (Inventive)

A 250 mL three-necked flask with a KPG stirrer and reflux cooler was initially charged with 80 µg of a siloxane of general formula $Me_3SiO[SiMe_2O]_{61.5}[SiMeH]_{6.5}SiMe_3$ and 112 g of a polyether having the general formula shown below

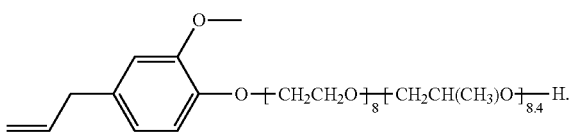

The excess of double bonds over SiH functions was 12%. The mixture was vigorously stirred and heated to 80° C. 8 ppm of Pt were added in the form of Karstedt's catalyst. The reaction mixture was stirred for 4 hours at 80° C. This afforded a clear product. The SiH conversion was 97%.

Example 15b: Production of a Polyether Siloxane with Allyl-Based Polyether (Non-Inventive)

A 250 mL three-necked flask with a KPG stirrer and reflux cooler was initially charged with 80 μg of a siloxane of general formula $Me_3SiO[SiMe_2O]_{61.5}[SiMeH]_{6.5}SiMe_3$ and 100 g of a polyether having the general formula shown below

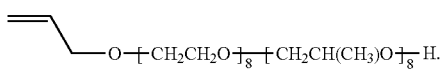

The excess of double bonds over SiH functions was 12%. The mixture was vigorously stirred and heated to 80° C. 8 ppm of Pt were added in the form of Karstedt's catalyst. The reaction mixture was stirred for 4 hours at 80° C. This afforded a clear product. The SiH conversion was only 89%. The SiH conversion did not improve even after a further 2 hours of reaction time.

Comparison of Examples 15a and 15b shows that the polyether according to the invention makes it possible to use a smaller excess of polyether to achieve high SiH conversions. This means that a smaller amount of free polyether remains in the product. A further important advantage over commonly used polyether siloxanes is that higher conversions are achieved.

Example 16: Performance Evaluation a.) Recipe for Producing a Pigment Preparation (Pigment Paste) with a Polyether According to the Invention:

|  | Feedstocks | |
| --- | --- | --- |
|  | 1 | 2 |
| DI water | 49 | 49 |
| Tego Foamex 830[a] | 1 | 1 |
| Polyether from Example 1 (inventive) | 10 |  |
| Polyether used in Example 15b (comparative) |  | 10 |
| Heliogen blue L7101f | 40 | 40 |
| Total | 100 | 100 |

[a]Defoamer, Evonik Industries AG b.) Production and Test Method:

The feedstocks were successively weighed into a 250 mL wide-necked flask and homogenized. 200 g of glass beads of diameter 2.5-2.8 mm were then weighed into the mixture. The mixture was dispersed for 2 hours in a DAS H[/A] 200K disperser (vent stage 1). The still-warm samples were filtered through a 400 μm rapid sieve and subsequently left to stand for 24 h.

A stock lacquer based on Neocryl XK 90 was produced for determination of colour properties.

TABLE 2

| Acrylate-based wood lacquer: | | |
| --- | --- | --- |
| Millbase | | |
| 1 | Tego Dispers 755 W[a] | 7.8 |
| 2 | Demin. $H_2O$ | 17.9 |
| 3 | Tego Foamex 830[b] | 0.9 |
| 4 | Parmetol K 40[c] | 0.1 |
| 5 | Aerosil 200[d] | 0.3 |
| 6 | Kronos 2310[e] | 63.0 |
| Let Down | | |
| 7 | Neocryl XK 90[f] | 103.8 |
| 8 | Texanol | 3.2 |
| 9 | Tego Wet KL 245[g] | 1.0 |
| 10 | Visko Plus 3000[h] | 2.0 |
| 10 min dispersal | | |
| Total | | 200.0 |

[a]Dispersant, Evonik Industries AG
[b]Defoamer, Evonik Industries AG
[c]Preservative, Schülke & Mayr
[d]Thixotropic agent, Evonik Industries AG
[e]White pigment (titanium dioxide), Kronos
[f]Polyacrylate dispersion, DSM
[g]Substrate-wetting agent, Evonik Industries AG
[h]Rheology additive, Evonik Industries AG Entries 1-6 in Table 2 were weighed into a 250 mL glass bottle. 100 g of glass pearls of diameter 2.5-2.8 mm were weighed into the mixture and the mixture was dispersed in a DAS H[/A] 200K disperser at vent stage 1 for 1 hour. Entries 7-10 were then added and the mixture was dispersed for a further 10 minutes. The lacquer was filtered through a 400 μm rapid sieve and left to stand for 24 h at room temperature before use.

Tinting of the White Lacquer:

10 g of lacquer and in each case 0.2 g of paste were weighed into small Dümmann cosmetic beakers of 60 ml in volume. The mixture was homogenized at 3000 rpm for 1 minute in a DAC 150 FVZ Speedmixer. The coloured lacquer was then applied to a Leneta 2DX contrast card using a 100 μm wire-wound doctor blade. After three minutes of initial drying time, a rub-out test was carried out. After 24 hours of through-drying time, L*a*b* values were measured using an X-Rite SP 62 sphere spectrophotometer using the "specular gloss included" setting. The delta E value of non-rubbed surface vs rubbed surface and colour strength were calculated. The colourimetric values are reproduced as constituents of the CIE L*a*b* colour model (DIN 6174: "Farbmetrische Bestimmung von Farbmaßzahlen und Farbabständen im angenähert gleichförmigen CIELAB-Farbenraum" [colourimetric evaluation of colour coordinates and colour differences according to the approximately uniform CIELAB colour space]).

What are sought are mobile white-based pigment preparations showing high colour strength and a low delta E value as is obtained by the inventive polyether from Example 1.

c.) Results

| Sample | Paste | | Colour properties | | | | |
| --- | --- | --- | --- | --- | --- | --- | --- |
| | Viscosity | Appearance | L* | a* | b* | ΔE | F |
| Polyether from Example 1 (inventive) | mobile | homogeneous, foam-free | 68.06 | −21.99 | −32.60 | 0.68 | 50.42 |
| Polyether used in Example 15b (comparative) | highly viscous, paste-like | inhomogeneous, pigment flocs | 86.86 | −10.82 | −11.20 | 27.37 | 6.57 |

The invention claimed is:

1. A process for producing alkoxylation products, the process comprising:
   (1) reacting at least one epoxide with eugenol in the presence of at least one transition metal catalyst, wherein the at least one transition metal catalyst is a double metal cyanide catalyst.
2. The process according to claim 1, wherein at least one epoxide is at least one member selected from the group consisting of ethylene oxide, propylene oxide, isobutylene oxide, epichlorohydrin, 2,3-epoxy-1-propanol, butylene oxide, 2,3-epoxybutane, 2,3-dimethyl-2,3-epoxybutane, 1,2-epoxypentane, 1,2-epoxy-3-methylpentane, 1,2-epoxyhexane, 1,2-epoxycyclohexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-poxycyclopentane, 1,2-epoxycyclohexane, vinylcyclohexene oxide, (2,3-epoxypropyl)benzene, vinyloxirane, 3-phenoxy-1,2-epoxypropane, 2,3-epoxy methyl ether, 2,3-epoxy ethyl ether, 2,3-epoxy isopropyl ether, 3,4-epoxybutyl stearate, 4,5-epoxypentyl acetate, 2,3-epoxypropane methacrylate, 2,3-epoxypropane acrylate, glycidyl butyrate, methyl glycidate, ethyl 2,3-epoxybut:anoate, 4-(trimethylsilyl)butane 1,2-epoxide, 4-(triethylsilyl)butane 1,2-epoxide, 3-(perfluoromefuyl)-1,2-epoxypropane, 3-(perfluoroethyl)-1,2-epoxypropane, 3-(perfluorobutyl)-1,2-epoxypropane, 3-(perfluorohexyl)-1,2-epoxypropane, 4-(2,3-epoxypropyl)morpholine, and 1-(oxiran-2-ylmethyl)pyrrolidin-2-one.
3. The process according to claim 1, wherein the at least one epoxide is at least one member selected from the group consisting of ethylene oxide and propylene oxide.
4. The process according to claim 3, wherein ethylene oxide and propylene oxide are employed in a molar ratio of from 3:1 to 1:3.
5. The process according to claim 1, further comprising co-reacting at least one further component selected from the group consisting of a cyclic anhydride, $CO_2$, a glycidyl ether, and a lactone.
6. The process according to claim 1,
   wherein, during said (1) reacting, a further component is present, and
   wherein the process further comprises:
   (2) reacting at least one product from said (1) reacting with at least one Si—H functional siloxane.
7. The process according to claim 6, wherein,
   during said (2) reacting, at least one product from said (1) reacting is reacted with at least one Si—H functional siloxane and a further component that comprises a terminally unsaturated group.

\* \* \* \* \*